United States Patent [19]

Wagner

[11] Patent Number: 4,468,598

[45] Date of Patent: Aug. 28, 1984

[54] PULSED X-RAY TUBE MOTOR

[75] Inventor: Howard G. Wagner, Wheeling, Ill.

[73] Assignee: The Machlett Laboratories, Incorporated, Stamford, Conn.

[21] Appl. No.: 222,186

[22] Filed: Jan. 2, 1981

[51] Int. Cl.³ .......... H02P 7/36

[52] U.S. Cl. .......... 318/341; 318/346

[58] Field of Search .......... 318/330, 341, 346, 415, 318/416, 519

[56] References Cited

U.S. PATENT DOCUMENTS

| | | | |
|---|---|---|---|
| 2,782,356 | 2/1957 | Mannheimer | 318/346 X |
| 3,205,360 | 9/1965 | Graves | 250/93 |
| 3,214,589 | 10/1965 | Teague | 250/93 |
| 3,244,884 | 4/1966 | McLaughlin | 250/93 |
| 3,249,840 | 5/1966 | Eriksson et al. | 318/346 X |
| 3,551,773 | 12/1970 | Dannettell et al. | 318/416 X |
| 3,641,408 | 2/1972 | Fiocca | 318/227 |
| 3,832,553 | 8/1974 | Seifert et al. | 250/406 |
| 3,855,511 | 12/1974 | Smith | 318/341 X |
| 3,917,949 | 11/1975 | Winkler | 250/402 |
| 3,943,356 | 3/1976 | Schmutzer | 250/406 |
| 3,963,930 | 6/1976 | Fiocca et al. | 250/402 |
| 3,971,974 | 7/1976 | Ichiyanagi | 318/341 |
| 4,162,436 | 7/1979 | Waldorf et al. | 318/341 X |
| 4,215,383 | 7/1980 | Boyd et al. | 318/346 X |
| 4,325,011 | 4/1982 | Peterson | 318/341 X |

*Primary Examiner*—G. Z. Rubinson
*Assistant Examiner*—W. E. Duncanson, Jr.
*Attorney, Agent, or Firm*—John T. Meaney; Joseph D. Pannone; Richard M. Sharkansky

[57] ABSTRACT

A motor control system for a rotating anode type of X-ray tube comprising an axially rotatable rotor provided with a radially extended target disc, an electrically wound stator encircling a portion of the rotor, and a motor controller electrically connected to the stator. The motor controller includes circuitry for initially energizing the stator a predetermined interval of time to accelerate rotation of the rotor, and then periodically energizing and de-energizing the stator at a frequency to utilize the inertia of the rotor and the target disc in maintaining the rotation of the rotor when the stator is deenergized.

6 Claims, 5 Drawing Figures

PULSED X-RAY TUBE MOTOR

BACKGROUND OF THE INVENTION

1. Field of the Invention

This invention relates generally to motor controllers and is concerned more particularly with circuitry having pulsed energizing means for controlling rotation of an anode target in an X-ray tube envelope.

2. Discussion of the Prior Art

A rotating anode type of X-ray tube generally comprises a tubular envelope having therein an electron emitting cathode disposed to beam electrons onto an aligned focal spot area of a rotatable anode target. Most of the electron energy incident on the focal spot area is converted into heat energy which could damage the focal spot area if allowed to become excessive. However, during operation of the tube, the anode target is rotated at a suitable speed for moving successive discrete areas of an annular focal track portion of the target through the focal spot area aligned with the cathode. As a result, each of the discrete areas of the focal track is rotated out of the focal spot area for a sufficient interval of time to dissipate the heat energy received in the focal spot area, whereby damage due to excessive heat energy is avoided.

Generally, the anode target is supported for axial rotation on one end portion of a heat restrictive stem which has an opposing end portion connected to a rotor of an alternating current type of induction motor disposed axially within a neck portion of the envelope. The stator of the induction motor usually is disposed externally of the envelope and in encircling relationship with the rotor within the neck portion of the envelope. During operation of the tube, an alternating current is passed through the field windings of the stator to establish a rotating magnetic field within the neck portion of the envelope to rotate the anode target relative to the cathode.

The field windings of the stator may be energized initially at an input power level sufficiently high to overcome the stationary inertia of the rotor assembly and to accelerate the assembly to a selected speed of rotation. Then, in order to avoid overheating of the enclosure in which the tube assembly is supported, the field windings may be energized at a reduced input power level sufficient to sustain the selected rotational speed of the rotor and anode target. In the prior art, this objective has been achieved by utilizing large power mechanical relays which, after a predetermined energizing time interval has elapsed, connect in the energizing circuit a stepdown transformer or large wattage resistors for reducing the input power level supplied to the field windings of the stator. However, because of size and heat dissipation requirements it has been found that the large mechanical relays and step-down transformer or large wattage resistors generally are unsuitable for lightweight portable X-ray generators.

SUMMARY OF THE INVENTION

Accordingly, these and other disadvantages of the prior art are overcome by this invention which comprises an X-ray system including an X-ray tube having an envelope wherein an anode target is supported for rotation by a rotor of an induction motor which has an external stator provided with a plurality of coils. The X-ray system also includes a motor controller electrically connected to the coils of the stator for establishing within the envelope a rotating magnetic field which causes the rotor to rotate the anode target.

The motor controller includes timed starting circuit means and pulsed running circuit means connected to a switching device which connects and disconnects the stator windings of the motor to a source of electrical power. As a result, the stator windings are energized initially to accelerate rotation of the rotor and the anode target into a desired speed range for a predetermined interval of time. Then, the stator windings are periodically energized and de-energized at regularly occurring intervals to permit the motor to run at a reduced duty cycle by using the rotational inertia of the rotor assembly to maintain its rotation in the desired speed range when the stator windings are de-energized.

BRIEF DESCRIPTION OF THE DRAWING

For a better understanding of this invention, reference is made in the following more detailed description to the drawings wherein.

DESCRIPTION OF THE PREFERRED EMBODIMENT

Figure 1:
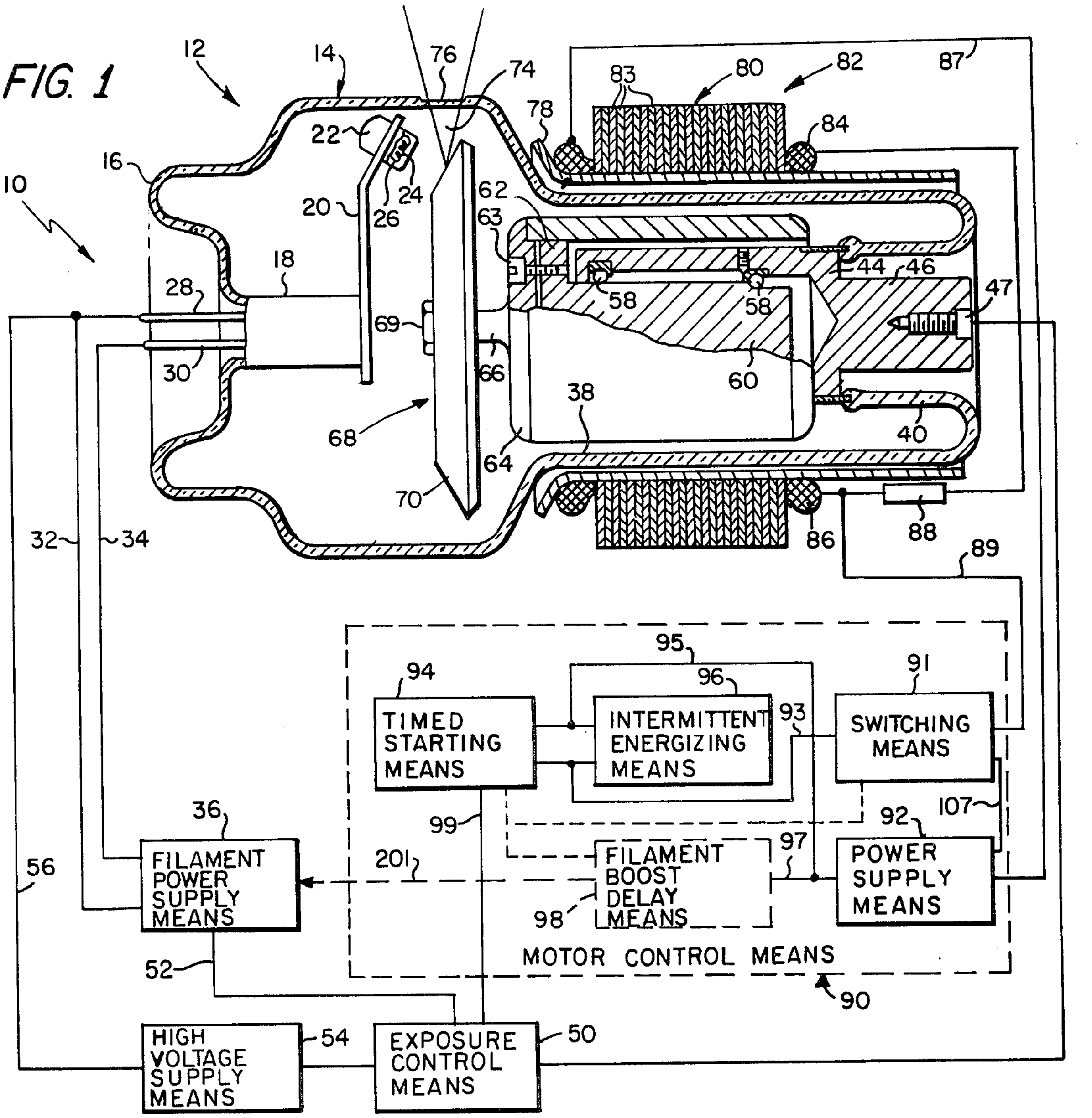
FIG. 1 shows an X-ray system embodying this invention.

Referring to the drawing wherein like characters of reference designate like parts, there is shown in FIG. 1 an X-ray generator sytem 10 including a rotating anode type of X-ray tube 12. Tube 12 comprises a tubular envelope 14 made of dielectric vitreous material, such as lead-free glass, for example. The envelope 14 has a reentrant end portion 16 peripherally sealed to a cathode cylinder 18 which extends axially within envelope 14. Cathode cylinder 18 has an inner end portion closed by an hermetically attached arm 20, which is hollow and extends radially outward from the cylinder 18.

A distal end portion of arm 20 is angulated with respect to the axial centerline of envelope 12 and supports a conventional cathode head 22. Cathode head 22 may comprise a helically wound filament 24 which is longitudinally disposed within a stepped opening of an electron focusing cup 26. Terminal end portions of the filament 24 are electrically connected to respective conductors 28 and 30 which extend through the hollow arm 20 and hermetically out of the envelope 14. External end portions of the conductors 28 and 30 are electrically connected, as by respective conductors 32 and 34, for example, to respective terminals of a filament power supply means 36.

Envelope 14 has an opposing neck end portion 38 of reduced diameter which is integrally joined to a reentrant portion 40 extending axially within envelope 14. The reentrant portion 40 has an inner end peripherally sealed to an adjacent end portion of an axially extending metal collar 42 which is circumferentially attached to an encircled portion of a stationary housing 44. Housing 44 is made of electrically conductive material, such as copper, for example, and has an adjacent end portion extending externally of envelope 14 to constitute an anode terminal 46 of tube 12.

The anode terminal 46 may be provided with fastening means, such as countersunk screw 47, for example, for connecting electrically to an external conductor 48. Conductor 48 is connectable electrically through an exposure control means 50 to a positive polarized terminal of a unidirectional high voltage supply means 54. The supply means 54 has a negative polarized terminal connected electrically through a conductor 56 to one of the cathode filament conductors, such as 28, for example. Thus, when the exposure control means 50 is activated, a suitable high voltage may be applied between the cathode and anode electrodes of tube 12 to establish therebetween a strong electron accelerating field for generating an X-ray beam.

Anode terminal 46 is connected electrically through housing 44 and internally mounted bearings 58 to an encircled shaft 60 which is made of electrically conductive material, such as stainless steel, for example. The shaft 60 is supported by the bearings 58 for axial rotation in the stationary housing 44, and extends out of an opposing open end of the housing to terminate in a radially extending flange 62. Flange 62 is spaced axially from the rim of housing 44 and is fixedly attached, as by angularly spaced screws 63, for example, to a substantially parallel closed end of a cup-shaped rotor 64. The rotor 64 is made of suitable electrically conductive material, such as copper, for example, and has an axially extending cylindrical wall disposed in outer spaced coaxial relationship with the housing 44. Thus, the cup-shaped rotor 64 is supported by the shaft 60 to have its axially extending wall rotatable about the stationary housing 44, and is electrically connected to the housing 44 through the bearings 58.

The closed end of cup-shaped rotor 64 has a central portion of its outer surface fixedly attached, as by brazing, for example, to one end of an axially extending stem 66, which is made of suitable electrically conductive material, such as molybdenum, for example. The stem 66 has an opposing end portion protruding through a central portion of a transversely disposed target disc 68, and is provided with a minimized diameter to restrict the flow of heat from the disc 68 to the bearings 58. The end portion of stem 66 protruding through disc 68 is threadingly engaged by a hex nut 69 to attach the disc 68 mechanically and electrically to the stem 66. Thus, the anode target disc 68 is electrically connected through anode terminal 46 and connecting electrical conductor 48 to exposure control means 50.

Preferably, the surface of anode target disc 68 adjacent the cathode head 22 has a frusto-conical configuration to provide a sloped outer peripheral portion which constitutes an annular focal track 70. Focal track 70 has a focal spot area 72 which is axially aligned with the electron emitting filament 24 of cathode head 22, and is radially aligned with an X-ray transmissive window 76 in envelope 14. The focal track 70 comprises a material, such as tungsten, for example, which readily emits X-rays when bombarded by high energy electrons. Accordingly, the entire target disc 68 may be made of X-ray emissive material or may be made of a relatively lightweight, high heat capacity material, such as carbon, for example, having focal track portion 70 provided with a surface layer of suitable X-ray emissive material, such as rhenium-tungsten alloy, for example.

In operation, the filament power supply means 36 sends an electrical current of sufficient value to heat the cathode filament 24 to near electron emitting temperature. Prior to taking an X-ray exposure, the filament power supply means receives from exposure control means 50 via conductor 52 a "boost" command signal to increase the temperature of cathode filament 24 to a desired, electron emitting temperature. When the filament 24 reaches the desired electron emitting temperature, a "ready" light (not shown) is illuminated in the exposure control means 50 to indicate to the operator that an X-ray exposure may be taken. Accordingly, the operator activates exposure control means 50 to cause high voltage supply means 54 to apply a selected voltage between the cathode and anode electrodes of tube 12. As a result, electrons emitted from cathode filament 24 are beamed onto the focal spot area 72 of target disc 68 with sufficient energy to generate X-rays which pass in a beam 74 through the window 76 of envelope 12.

Figure 2:
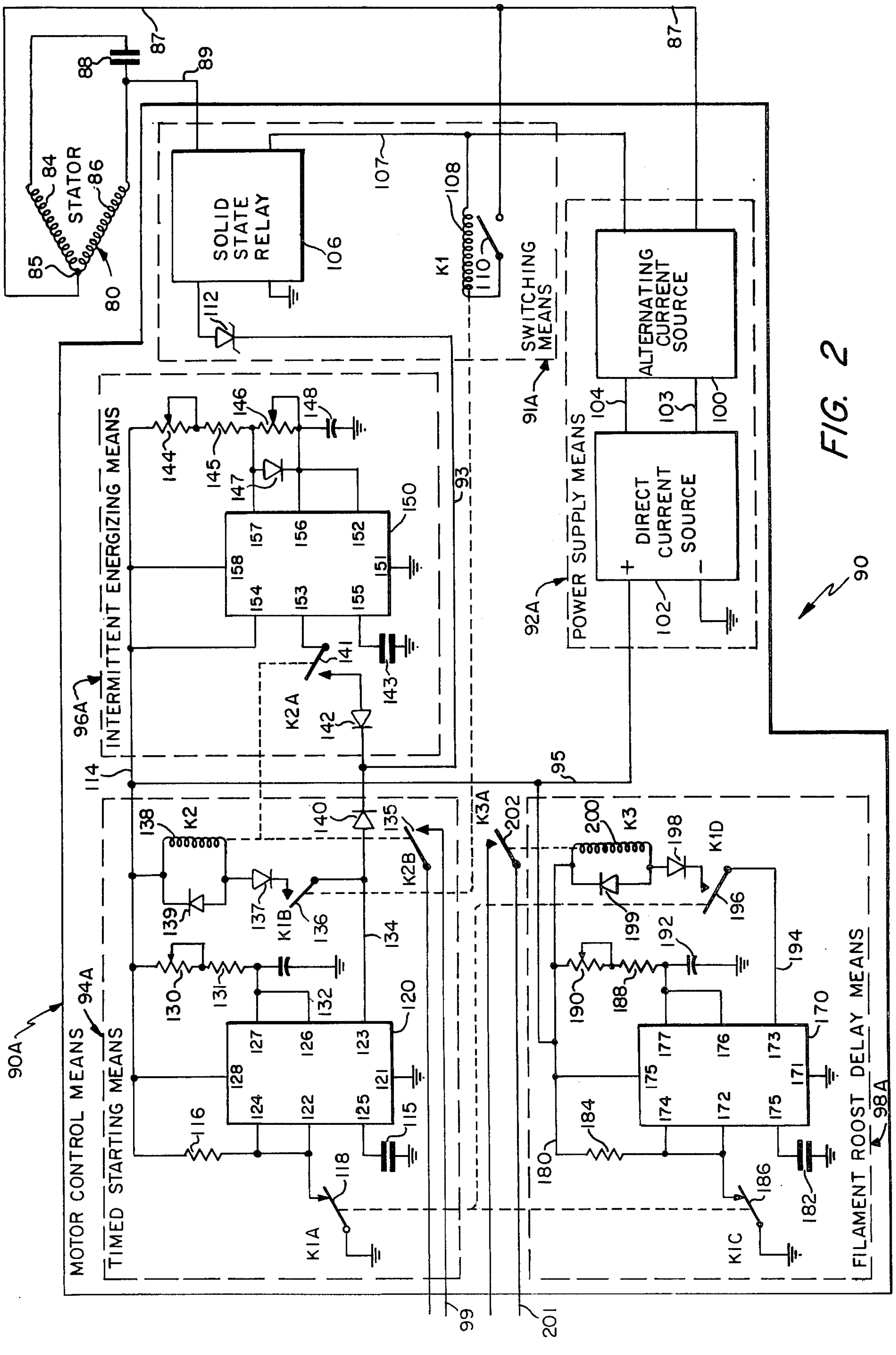
FIG. 2 is a preferred embodiment of the motor control means shown in FIG. 1.

However, most of the electron energy incident on the focal spot area 72 of target disc 68 is converted into heat which must be dissipated before damage to surface of focal spot area 72 occurs. Consequently, the target disc 68 is rotated axially to move successive discrete regions of the focal track 70 into and out of the focal spot area 72 aligned with the electron emitting filament 24 of cathode head 22. Thus, while a particular discrete region of focal track 70 in focal spot are 72 is being bombarded with electrons beamed from filament 24, other discrete regions of the focal track 70 rotated out of the focal spot area 72 may be dissipating heat energy acquired while in the focal spot area. Accordingly, proper operation of X-ray tube 12 requires that the anode target disc 68 be rotated in a range of angular velocities where damage to the surface of focal track 70 is minimized The required rotation of anode target disc 68 generally is achieved by inserting the neck end portion 38 of envelope 14 into a dielectric sleeve 78 made of suitable nonmagnetic material, such as transparent glass, for example. Sleeve 78 is encircled by a stator 80 of an alternating current induction type motor 82 which also includes the rotor 64 rotatingly supported within the neck end portion 38 of envelope 12. The stator 80 includes a laminated core 83 of stacked rings made of nonmagnetic material, such as silicon steel, for example. The stacked rings of core 83 form an inwardly projecting array of annularly spaced pole pieces (not shown) which extend longitudinally of stator 80, and support a plurality of wound coils, such as 84 and 86, for example. Coils 84 and 86 are electrically connected to one another and have respective terminal end portions attached directly to one another in a common junction 85 (FIG. 2). The junction 85 is connected electrically through a conductor 87 to a power supply means 92 in a motor control means 90. The other terminal end portion of coil 84 is electrically coupled through a phase shifting means, such as capacitor 88, for example, to the other terminal end portion of coil 86 which is electrically connected through a conductor 89 to a switching means 91 in the motor control means 90.

In motor control means 90, the switching means 91 is connected electrically through a conductor 107 to the power supply means 92. The switching means 91 also is electrically connected through a conductor 93 to a junction which is connected to respective output terminal portions of a timed starting means 94 and an intermittant energizing means 96. Both, the timed starting means 94 and the intermittent energizing means 96, are connected electrically through a conductor 95 to the power supply means 92; and the timed starting means 94 is coupled through a conductor 99 to the exposure control means 50. Power supply means 92 may be electrically connected through a conductor 97 to a filament boost delay means 98, which is not essential for proper operation of the motor controller 90. If utilized, the filament boost delay means 98 may be coupled through a conductor 201 to the filament power supply means 36.

As shown in FIG. 2, the motor control means 90 may be embodied in a motor controller 90A having a power supply means 92A which includes an alternating current source 100, such as a conventional alternating current power line, for example. The power supply means 92A also includes a direct current source 102, such as a rectifier power supply, for example, which is connected electrically through respective input conductors 103 and 104 to the alternating current source 100. Source 100 also is connected electrically through conductor 87 to the common junction 85 of stator coils 84 and 86, respectively. The other terminal end portions of stator coils 84 and 86 are electrically connected through conductor 89 to an output terminal of solid state relay 106 in a switching means 91A. When energized, the solid state relay 106 electrically connects the conductor 89 to another one of its terminals which is connected to a conductor 107. Conductor 107 is connected electrically to the alternating current source 100, and is connected through an energizing coil 108 of a relay K1 to a movable contact of a START switch 110 which has a stationary contact connected through conductor 87 to the alternating current source 100. When closed, the switch 110 connects the coil of relay K1 across the alternating current supply 100 thereby energizing or activating the relay K1. Also, when solid state relay 106 is energized, alternating current flows from the source 100 and through the respective coils 84 and 86 to establish the rotating magnetic field which causes rotation of rotor 64 and target disc 68 at a corresponding angular velocity.

Direct current source 102 has a negative polarized output terminal connected to electrical ground, and has another output terminal polarized at a relatively positive voltage, such as twelve volts with respect to ground, for example. The positive polarized terminal of source 102 is connected through the conductor 95 to a buss conductor 114 which extends into a timed starting circuit 94A and into an intermittent energizing circuit 96A of the motor controller 90A. In timed starting circuit 94A, the buss conductor 114 is connected directly to a Vcc terminal 128 of a "one-shot" timing means, such as a monostable multivibrator 120, for example, which may comprise a model 555 integrated ciruit device sold by Raytheon Company of Lexington, Mass. The monostable multivibrator 120 has a terminal 121 connected to electrical ground, and a terminal 125 coupled to electrical ground through an interposed capacitor 115. A reset terminal 124 and a trigger terminal 122 of multivibrator 120 are connected to one another for electrical connection through a resistor 116 to the buss conductor 114, and for electrical connection to ground through a normally closed contact arm 118 of the relay K1. Thus, when the coil 108 of relay K1 is energized as described, the contact arm 118 opens thereby permitting the reset terminal 124 and the trigger terminal 122 of multivibrator 120 to have applied thereto the full value of the voltage on buss conductor 114.

The buss conductor 114 also is electrically connected through an adjustable resistor 130 and a series connected resistor 131 to a junction which is connected to a discharge terminal 127 and a threshold terminal 126 of multivibrator 120, and to a plate of a capacitor 132 having an opposing plate connected to electrical ground. An output terminal 123 of device 120 is connected through a conductor 134 to a normally open contact arm 136 of the relay K1. Contact arm 136 is connectable through a diode 137 to a junction with an energizing coil 138 of a relay K2 and a parallel connected diode 139, both of which are connected in common to the buss conductor 114. The conductor 134 connecting to output terminal 123 of device 120 also is connected through a diode 140 to a junction with the conductor 93. In switching circuitry 91A, conductor 93 is connected electrically through a zener diode 112 to an input terminal of a suitable type of relay, such as a conventional solid state relay 106, for example, which has another input terminal connected to electrical ground.

Thus, when the voltage applied to trigger terminal 122 and reset terminal 124 of multivibrator 120 increases to the full value of voltage on buss conductor 114, it passes through a triggering value, such as one-third of the full value, for example, which is sensed at the trigger terminal 122. As a result, within multibrator 120, the discharge terminal 127 is disconnected from electrical ground thereby allowing the capacitor 132 to commence charging up to the full value in a time interval determined by adjustment of the resistor 130. Also, the voltage applied to output terminal 123 of multivibrator 120 changes abruptly from a zero value to the full value of voltage applied to buss conductor 114. Consequently, this full value of voltage is applied through conductor 134 and diode 140 to the conductor 93 which is connected through zener diode 112 to an input terminal of solid state relay 106. As a result, the solid state relay 106 is energized to connect the conductor 89 from stator coils 84 and 86, respectively, to the alternating current source 100, as described. Accordingly, the stator 80 establishes within neck end portion 38 of envelope 12 the rotating magnetic field which causes the rotor 64 of motor 82 to accelerate rotation of the target disc 68 to a desired angular velocity.

However, after a time interval determined by adjustment of resistor 130, such as five seconds, for example, the voltage of capacitor 132 passes through a larger fraction of the full value, such as two-thirds of full value, for example, which is sensed at the threshold terminal 126. Consequently, within the multivibrator 120, discharge terminal 127 is connected to electrical ground thereby enabling the capacitor 132 to commence discharging. Also, the voltage applied to output terminal 123 changes abruptly from the full value of twelve volts to zero value and deenergizes the solid state relay 106. Accordingly, the stator 80 is disconnected from the alternating current source 100; and the target disc 68 is allowed to coast at acceptable angular velocities by virtue of the energy stored in the flywheel-like target disc.

During the described energizing interval of motor 82 when the voltage applied to conductor 134 is maintained at the full value, there is a zero voltage drop between the buss conductor 114 and the conductor 134. Consequently, the current flowing through the relay coil 138 of relay K2 is substantially zero value. However, when the energizing interval of motor 82 is completed and the voltage applied to conductor 134 has changed abruptly to zero value, a resulting electrical current flowing through coil 138 energizes the relay K2 to close the contact arm 135 connected to conductor 99 for completing an enabling circuit (not shown) in exposure control means 50, and to close the contact arm 141 in intermittent energizing circuit 96A. As a result, an output terminal 153 of a repeating timer means, such as a bistable multivibrator device 150, for example, which may comprise a Model 555 device sold by Raytheon Company of Lexington, Massachusetts. The intermittent energizing circuit 96A is connected through the closed contact arm 141 of relay K2 and a forward biased diode 142 to the conductor 93, which is connected to solid state relay 106.

In intermittent energizing circuit 96A, the buss conductor 114 is connected directly to a reset terminal 154 and a Vcc terminal 158 of the device 150. Also, the device 150 has a ground terminal 151 connected directly to electrical ground, and has a terminal 155 coupled to electrical ground through an interposed capacitor 143. The buss conductor 114 also is connected electrically through an adjustable resistor 144 and a series connected resistor 145 to a junction of a discharge terminal 157 of device 150, a forward biased diode 147, and an adjustable resistor 146. Diode 147 and adjustable resistor 146 are connected to a junction of a threshold terminal 156 and a trigger terminal 152 of device 150 as well as a terminal of a capacitor 148 which has an opposing terminal connected to electrical ground.

Adjustable resistor 146 determines the discharging rate of capacitor 148 and, consequently, is adjusted to determine a suitable coast time interval wherein the angular velocity of target disc 68 does not decrease below a specified minimum value. The coast time interval is completed when the discharging of capacitor 148 reaches a trigger voltage level, such as one-third of full value, for example, which is sensed at the trigger terminal 152 of device 150. As a result, the terminal 157 of device 150 is disconnected from electrical ground thereby permitting the capacitor 148 to commence charging to full value; and the voltage applied to output terminal 153 is changed abruptly from a zero value to the full value applied to buss conductor 114. Thus, the solid state relay 106 is energized through conductor 93 and zener diode 112 to connect the alternating current source 100 to the stator coils 84 and 86 of motor 82. Accordingly, the rotor 64 of motor 80 is rotated more rapidly to accelerate rotation of target disc 68 to a higher acceptable value within a predetermined range of velocities.

Adjustable resistor 144 determines the charging rate of capacitor 148 and, consequently, is adjusted to determine a suitable acceleration time interval wherein the angular velocity of target disc 68 does not increase above a specified maximum value. The acceleration time interval is completed when the charging of capacitor 148 reaches a threshold voltage level, such as two-thirds of full value, for example, which is sensed at the threshold terminal 156 of device 150. As a result, the terminal 157 of device 150 is connected to electrical ground thereby permitting the discharging of capacitor 148, and the voltage applied to output terminal 153 changes abruptly from the full value of voltage applied to buss conductor 114 to zero value.

Figure 3:
FIG. 3 is a graphic view illustrating operation of the repeatable timing means shown in FIG. 2.
Figure 4:
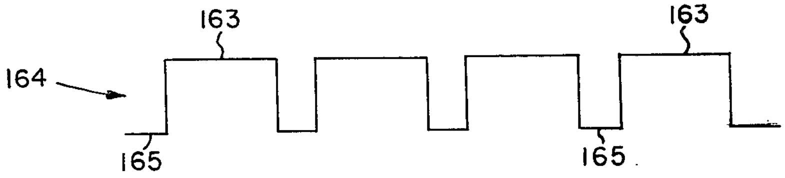
FIG. 4 is a graphic view illustrating the output of the intermittent energizing circuit shown in FIG. 2.

Thus, as shown in FIG. 3, the charging and discharging of capacitor 148 may be represented in the form of a sawtooth wave 160 having nadir trigger values 161 which are a predetermined fraction, such as one-third of the full value applied to buss conductor 114, for example, and having apex threshold values 162 which are a predetermined higher fraction, such as two-thirds, for example, of the full value. Also, as shown in FIG. 4, the output 153 of bistable multivibrator 150 may be represented by a square wave 164 which varies abruptly from maximum values 163 to minimum values 165 when the stator 80 of motor 82 is de-energized to permit coasting rotation of target disc 68.

Figure 5:
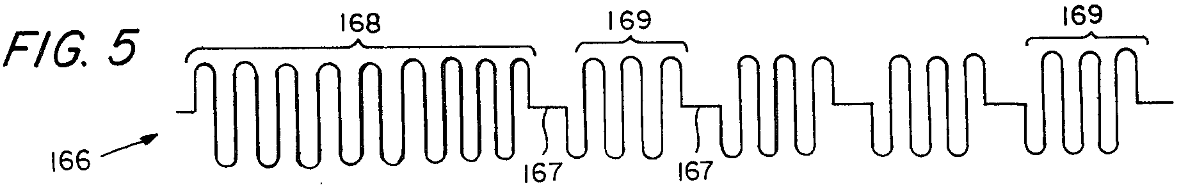
FIG. 5 is a graphic view illustrating operation of the motor shown in FIG. 1.

Accordingly, as shown in FIG. 5, the stator 80 of motor 82 is energized by a train 166 of alternating current comprising an initial interval 168 such as five seconds, for example, when activation of timed starting circuit 94A, energizes the stator 80 to accelerate the rotor 64 and target disc 68 to a predetermined velocity. Then, the stator 80 is de-energized for an interval of time 167 determined by adjustment of resistor 146 in intermittent energizing circuit 96A whereby the rotor 64 and target disc 68 are allowed to coast due to rotational inertia developed therein during the preceding acceleration. The coasting interval 167 is terminated by the discharging of capacitor 148 in intermittent energizing circuit 96A causing the output of multivibrator 150 to change abruptly to a maximum value 163 and enable the relay 106 to send a pulse 169 of alternating current to energize the stator 80 for an accelerating interval of time. Subsequently, the discharging and recharging of capacitor 148, as shown in FIG. 3, causes the output 153 of multivibrator 150 to change alternately between maximum values 163 to minimum values 165, respectively. As a result, the stator 80 is periodically de-energized for predetermined intervals 167 of time to permit coasting rotation of the target disc 68, and then is re-energized with a pulse 169 of alternating current to accelerate rotation of the target disc 68 to a velocity within a specified range of values. During these coasting intervals 167 of time, rotation of target disc 68 is maintained within the specified range by utilizing the inertia or "flywheel effect" of the rotating target disc 68. The momentum of rotating disc 68 constitutes a source of stored energy which is developed during acceleration of the disc 68, and is fed back into the system during the coasting intervals 167 of time.

The motor controller 90A also may include a filament boost delay circuit 98A having a buss conductor 180 which is electrically connected through the conductor 95 to the positively polarized output terminal of direct current source 104. Buss conductor 180 is connected directly to a Vcc terminal 175 of a time delay device 170, such as a Model 555 device sold by Raytheon Company of Lexington, Mass. for example. Device 170 has a ground terminal 171 connected to electrical ground and a terminal 175 coupled to electrical ground through an interposed capacitor 182. Also, the device 170 has a reset terminal 174 and a trigger terminal 172 electrically connected through a resistor 184 to the buss conductor 180, and electrically connected through a normally closed contact arm 186 to electrical ground. Device 170 also has a discharge terminal 177 and a threshold terminal 176 electrically connected through a resistor 188 and an adjustable resistor 190 to the buss conductor 180, and electrically connected to a plate of a capacitor 192 which has an opposing plate connected to electrical ground. An output terminal 173 of device 170 is connectable through a conductor 194, a normally open contact arm 196 of the relay K1, a diode 198 and a parallel connected coil 200 of a relay K3 and a diode 199 to the buss conductor 180. The relay K3 has a normally open contact arm 202 disposed in electrical series with a portion of conductor 201, which is connected into filament power supply 36 for delaying heating of the filament 24 to higher electron emitting temperatures until the target disc 68 is rotating in a desired range of angular velocities.

In operation, when relay K1 is energized, the contact arm 186 is opened to disconnect the trigger terminal 172 and the reset terminal 174 from electrical ground; and the contact arm 196 is closed to connect the output terminal 173 of device 170 through diode 198 to coil 200 of relay K3. Accordingly, the voltage applied to trigger terminal 172 and reset terminal 174 of device 170 increases to the full value of voltage, such as twelve volts, for example, applied to buss conductor 180. As a result, when the voltage applied to trigger terminal 172 reaches a fraction, such as one-third, for example, of full value, the voltage applied to output terminal 173 of device 170 changes abruptly from a zero value to the full value of twelve volts. However, since there is no voltage drop between the buss conductor 180 and the output conductor 194, there is no current through the coil 200 to energize relay K3. Simultaneously, the discharge terminal 177 of device 170 is disconnected from electrical ground to permit the capacitor 192 to charge up to the full value in a time interval determined by the adjustment of resistor 190.

When the voltage charging capacitor 192 reaches a fraction, such as two-thirds, for example, of the full value which is sensed at threshold terminal 176, the discharge terminal 177 of device 170 is connected to electrical ground, thereby allowing the capacitor 192 to discharge. Also, the voltage applied to output terminal 173 of device 170 changes abruptly from full value to zero value, thus developing a voltage drop between the buss conductor 180 and the output conductor 194. As a result, a current passes through coil 200 to energize relay K3 and close the contact arm 202 in series with conductor 201, whereby a circuit (not shown) in filament power supply 36 is completed to permit a higher value of current to flow through the filament 24 and boost it to a desired electron emitting temperature. When the electron emitting temperature is reached, a "ready" light is illuminate in exposure control means 50 to signal the operator that an exposure switch (not shown) may be actuated to initiate an X-ray exposure.

Accordingly, there has been disclosed herein an X-ray system including an X-ray tube of the rotating anode type having an alternating current induction motor provided with motor control means for pulsing the stator to rotate the rotor in accelerating intervals of time and then de-energizing the stator to permit the rotor to coast by virtue of the inertia of the rotating rotor. Although the the sawtooth wave 160 in FIG. 3 is shown for a seventy-five percent duty cycle, the respective resistors 144 and 146 may be adjusted such that the associated sawtooth wave 160, is representative of another duty cycle, such as a fifty percent duty cycle, for example. Also, although the motor controller of this invention has been illustrated herein with an X-ray tube of the rotating anode type, it may equally well be applied to other types of systems having motors with rotatable members which can store energy during pulsed acceleration intervals and feed the energy back to the motor during coasting intervals of time.

From the foregoing, it will be apparent that all of the objectives of this invention have been achieved by the structures shown and described herein. It also will be apparent, however, that various changes may be made by those skilled in the art, without departing from the spirit of the invention as expressed in the appended claims. It is to be understood, therefore, that all matter shown and described herein is to be interpreted as illustrative and not in any limiting sense.

What is claimed is:

1. A system comprising:
motor means having a rotatable shaft and electrically disposed for accelerating rotation of said shaft; and
motor control means coupled to said motor means for, independently of the instantaneous velocity of said shaft, electrically activating the motor means at a regular period to accelerate rotation of said shaft and, independently of the electrical operating characteristics of said motor means, de-activating the motor means to permit coasting rotation of said shaft.

2. A system comprising:
motor means having a rotatable shaft and electrically disposed for accelerating rotation of said shaft; and
motor control means coupled to said motor means for, independently of the instantaneous velocity of said shaft, electrically activating the motor means at a regular period to accelerate rotation of said shaft and de-activating the motor means to permit coasting rotation of said shaft during a predetermined interval of time independent of electrical operating characteristics of said motor means, the motor control means including adjustment means for varying the period of said activating and deactivating.

3. A system comprising:
motor means having a rotatable shaft and disposed for accelerating rotation of said shaft; and
motor control means coupled to said motor means for, independently of the instantaneous velocity of said shaft, energizing the motor means to accelerate rotation of said shaft to a predetermined velocity, said control means including means for periodically de-energizing the motor means during a shaft coasting interval of time independent of the electrical operating characteristics of said motor means and re-energizing the motor means during a shaft accelerating interval of time sufficient to compensate for losses occurring during the shaft coasting interval of time.

4. A system comprising:
an X-ray tube having an envelope and an X-ray target means disposed for rotation in the envelope;
motor means coupled to said target means for rotating the target means in the envelope; and
motor control means connected to said motor means for energizing the motor means to accelerate rotation of the target means to a velocity within a predetermined range of velocities, and for periodically de-energizing and re-energizing the motor means independently of the instantaneous velocity of the target means to maintain the velocity of rotation of the target means within said predetermined range of velocities.

5. A system as set forth in claim 4 wherein said motor control means includes timed starting circuit means for initially energizing said motor means a predetermined interval of time, and includes pulsed running circuit means for periodically energizing said motor means at a frequency sufficient to maintain the velocity of rotation of the target means within said predetermined range of velocities.

6. A system as set forth in claim 4 wherein said motor control means includes delay circuit means for withholding effective operation of said X-ray tube until said target means is rotating within said predetermined range of velocities.

* * * * *